US008181182B1

(12) United States Patent
Martin

(10) Patent No.: US 8,181,182 B1
(45) Date of Patent: May 15, 2012

(54) RESOURCE ALLOCATION BROKERING IN NESTED CONTAINERS

(75) Inventor: Jean-Christophe Martin, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1550 days.

(21) Appl. No.: 10/990,741

(22) Filed: Nov. 16, 2004

(51) Int. Cl.
*G06F 9/46* (2006.01)
*G06F 15/173* (2006.01)
*G06F 3/00* (2006.01)

(52) U.S. Cl. ........ 718/104; 718/105; 719/313; 719/318; 709/226

(58) Field of Classification Search .............. 718/1, 100, 718/101, 102, 103, 104, 105; 719/311, 312, 719/313, 314, 315, 318; 709/201, 203, 206, 709/207, 215, 220, 221, 226
See application file for complete search history.

(56) References Cited

U.S. PATENT DOCUMENTS

| 4,253,145 | A | * | 2/1981 | Goldberg ..................... 703/21 |
| 5,155,809 | A | | 10/1992 | Baker et al. |
| 5,283,868 | A | | 2/1994 | Baker et al. |
| 5,291,597 | A | | 3/1994 | Shorter et al. |
| 5,325,517 | A | | 6/1994 | Baker et al. |
| 5,325,526 | A | | 6/1994 | Cameron et al. |
| 5,345,590 | A | | 9/1994 | Ault et al. |
| 5,437,032 | A | | 7/1995 | Wolf et al. |
| 5,522,070 | A | * | 5/1996 | Sumimoto ................... 718/104 |
| 5,590,314 | A | | 12/1996 | Ueno et al. |
| 5,682,530 | A | * | 10/1997 | Shimamura ................. 718/104 |
| 5,784,706 | A | | 7/1998 | Oberlin et al. |
| 5,841,869 | A | | 11/1998 | Merkling et al. |
| 5,845,116 | A | | 12/1998 | Saito et al. |
| 5,925,102 | A | | 7/1999 | Eilert et al. |
| 5,963,911 | A | | 10/1999 | Walker et al. |
| 5,983,270 | A | | 11/1999 | Abraham et al. |
| 6,074,427 | A | | 6/2000 | Fought et al. |
| 6,075,938 | A | | 6/2000 | Bugnion et al. |

(Continued)

FOREIGN PATENT DOCUMENTS

EP  1043658 A1 * 10/2000

(Continued)

OTHER PUBLICATIONS

Current Claims in EPO patent application No. 04 252 690.5-2211 (9 pgs)—attached.

(Continued)

*Primary Examiner* — Jennifer To
*Assistant Examiner* — Abdullah Al Kawsar
(74) *Attorney, Agent, or Firm* — Osha • Liang LLP

(57) ABSTRACT

In accordance with one embodiment of the present invention, there is provided a technique for resource allocation brokering in nested containers. According to one aspect, a broker mechanism is established within a first container. A second container also is established within the first container. The second container has a client mechanism. The first container's broker mechanism communicates with the second container's client mechanism to provide notices to the second container's client mechanism. The second container also has a broker mechanism that may or may not be a part of the second container's client mechanism. A third container is established within the second container. The third container also has a client mechanism. The second container's broker mechanism communicates with the third container's client mechanism to provide notices to the third container's client mechanism. Thus, communications are facilitated between higher-level containers and lower-level containers in a hierarchy of nested containers.

24 Claims, 3 Drawing Sheets

U.S. PATENT DOCUMENTS

| | | | |
|---|---|---|---|
| 6,223,202 B1 * | 4/2001 | Bayeh | 718/102 |
| 6,247,109 B1 * | 6/2001 | Kleinsorge et al. | 712/13 |
| 6,279,046 B1 | 8/2001 | Armstrong et al. | |
| 6,289,462 B1 | 9/2001 | McNabb et al. | |
| 6,334,114 B1 * | 12/2001 | Jacobs et al. | 705/26 |
| 6,356,915 B1 | 3/2002 | Chtchetkine et al. | |
| 6,385,658 B2 * | 5/2002 | Harter et al. | 719/312 |
| 6,430,618 B1 * | 8/2002 | Karger et al. | 709/225 |
| 6,438,594 B1 | 8/2002 | Bowman-Amuah | |
| 6,633,963 B1 | 10/2003 | Ellison et al. | |
| 6,681,238 B1 | 1/2004 | Brice et al. | |
| 6,681,258 B1 | 1/2004 | Ratcliff et al. | |
| 6,704,766 B1 * | 3/2004 | Goss et al. | 718/104 |
| 6,725,457 B1 | 4/2004 | Priem et al. | |
| 6,738,832 B2 | 5/2004 | Burr et al. | |
| 6,792,514 B2 | 9/2004 | Kapoor et al. | |
| 6,813,766 B2 | 11/2004 | Hay | |
| 6,859,926 B1 | 2/2005 | Brenner et al. | |
| 6,938,169 B1 | 8/2005 | Caronni et al. | |
| 6,944,699 B1 | 9/2005 | Bugnion et al. | |
| 6,957,435 B2 | 10/2005 | Armstrong et al. | |
| 6,961,941 B1 | 11/2005 | Nelson et al. | |
| 6,993,762 B1 | 1/2006 | Pierre | |
| 7,003,777 B2 * | 2/2006 | Hines | 719/316 |
| 7,027,463 B2 | 4/2006 | Mathew et al. | |
| 7,047,337 B2 * | 5/2006 | Armstrong et al. | 710/200 |
| 7,058,947 B1 * | 6/2006 | Raja et al. | 718/104 |
| 7,076,633 B2 | 7/2006 | Tormasov et al. | |
| 7,076,634 B2 | 7/2006 | Lambeth et al. | |
| 7,095,738 B1 | 8/2006 | Desanti | |
| 7,096,469 B1 | 8/2006 | Kubala et al. | |
| 7,099,948 B2 | 8/2006 | Tormasov et al. | |
| 7,103,745 B2 | 9/2006 | Koning et al. | |
| 7,143,168 B1 * | 11/2006 | DiBiasio et al. | 709/226 |
| 7,188,120 B1 | 3/2007 | Leonard et al. | |
| 7,194,439 B2 | 3/2007 | Kassan et al. | |
| 7,363,495 B2 | 4/2008 | Felt et al. | |
| 7,461,144 B1 | 12/2008 | Beloussov et al. | |
| 2002/0069369 A1 | 6/2002 | Tremain | |
| 2002/0083367 A1 | 6/2002 | McBride et al. | |
| 2002/0120660 A1 | 8/2002 | Hay et al. | |
| 2002/0156824 A1 | 10/2002 | Armstrong et al. | |
| 2002/0161817 A1 | 10/2002 | Dorofeev et al. | |
| 2002/0173984 A1 | 11/2002 | Robertson et al. | |
| 2003/0014466 A1 | 1/2003 | Berger et al. | |
| 2003/0037089 A1 * | 2/2003 | Cota-Robles et al. | 709/1 |
| 2003/0037092 A1 * | 2/2003 | McCarthy et al. | 709/104 |
| 2003/0069939 A1 | 4/2003 | Russell | |
| 2004/0010624 A1 | 1/2004 | Garofalo et al. | |
| 2004/0162914 A1 | 8/2004 | St. Pierre et al. | |
| 2004/0210760 A1 | 10/2004 | McGrath et al. | |
| 2005/0021788 A1 | 1/2005 | Tucker et al. | |

FOREIGN PATENT DOCUMENTS

| | | |
|---|---|---|
| EP | 1253516 A2 * | 10/2002 |
| EP | 1 282 038 A2 | 2/2003 |
| EP | 1300766 A | 4/2003 |
| WO | WO 00/45262 A2 | 8/2000 |

OTHER PUBLICATIONS

Mc Dougall, Richard, et al., "Resource Management", Prentice Hall, 1999, 25 pages.

Hewlett-Packard, "Installing and Managing HP-UX Virtual Partitions (vPars)", Third Edition, Part No. T1335-90018, Copyright Hewlett-Packard Company, Nov. 2002, pp. 1-4, 17-44, 72-75, and 157-161.

Hope, Paco, "Using Jails in FreeBSD for Fun and Profit", ;Login: The Magazine of Usenix and Sage, vol. 27, No. 3, Jun. 2002, 9 pages.

Kamp, Poul-Henning, "Rethinking / dev and devices in the UNIX kernel", BSDCon 2002 Paper, retrieved from website .usenix.org/events/bsdcon02/full_papers/kamp/kamp_html/index.html> Printed May 1, 2007, 18 pages.

Thompson, K., "UNIX Implementation", Bell Laboratories, The Bell System Technical Journal, 1978, pp. 1-9.

Official Action from EPO for foreign patent application No. 04 252 690.51-2211 dated Jun. 10, 2005 (6 pgs)—attached.

Current Claims in EPO patent application No. 04 252 690.5-2211 (9 pgs)—attached, Filed on May 7, 2004.

European Patent Office, "European Search Report," application No. 04252689.7, mailing date Jul. 28, 2005, 3 pages.

Current Claims, European patent application 04252689.7, 6 pages, Filed on May 7, 2004.

Sun Microsystems, "Sun EnterpriseTM 1000 Server: Dynamic System Domains," White Paper Online, Feb. 26, 2003, retrieved from the internet at <http://www.sun.com/servers/highend/whitepapers/domains.html?facet=-1>, retrieved on Jun. 21, 2005, XP-002332946, 7 pages.

Official Action from EPO for foreign patent application No. 04 252 690.5-2211 dated Nov. 23, 2005 (5 pgs)—attached.

Chris Dalton and Tse Huong Choo, "An Operating System Approach to Securing E-Services," Communications from the ACM (ISSN: 0001-0782) vol. 44, Issue 2 (2001), (8 pgs).

Glenn Faden, Sun Microsystems, Inc. Server Virtualization with Trusted Solaris™ 8 Operating Environment. Sun BluePrints™ OnLine—Feb. 2002 [online].Retrieved from the internet:<<URL: http://www.sun.com/blueprints>, (21 pgs).

R. Hinden, Nokia, S. Deering, Cisco Systems, "IP Version 6 Addressing Architecture", Network Working Group, Request for Comments: 2373, Jul. 1998, (28 pgs).

IBM, "Partitioning for the IBM eserver pSeries 690 System," 2001, (12 pgs).

Mark T. Chapman, IBM Server Group, "System Partitioning on IBM eserver xSeries Servers," Effective Server Consolidation and Resource Management with System Partitioning, Dec. 2001, (23 pgs).

Virtual Private Servers and Security Contexts [online], [retrieved May 10, 2004]. Retrieved from the Internet:<URL: http://www.solucorp.qc.ca/miscprj/s_content.hc?prjstate=1&nodoc=0>, (2 pgs).

SunSoft, "File System Administration", 1994, Sun Microsystems, Inc., (62 pgs).

Poul-Henning Kamp and Robert N.M. Watson, "Jails: Confining the omnipotent root.," The FreeBSD Project, Retrieved from the Internet:<URL http://www.servetheweb.com/>, (15 pgs), May 2000.

European Patent Office, "European Search Report" from the for Foreign Patent Application No. 04252690.5, Aug. 31, 2004, (3 pgs.).

Claims As Filed in European Patent Application No. 04252690.5, (6 pgs.), Filed on May 7, 2004.

Overview of Bandwidth Broker System [online], [retrieved on Jan. 31, 2005]. Retrieved from the internet: <URL: http://www.ittc.ku.edu/~kdrao/845/into.html>, (19 pgs).

QBone Signaling Design Team Final Report [online], [retrieved on Jan. 31, 2005]. Retrieved from the internet: <URL: http://qos.internet2.edu/wg/documents-informational/20020709-chimento-etal-qbone-signaling.>, (33 pgs.).

European Patent Office, "Result of Consultation", Application No. 04252689.7-1243, dated Aug. 11, 2008, 2 pages.

Claims, Application No. 04252689.7-1243, 6 pages, Filed on May 7, 2004.

* cited by examiner

RESOURCE ALLOCATION BROKERING IN NESTED CONTAINERS

CROSS-REFERENCE TO RELATED APPLICATIONS

The present application contains subject matter that may be related to the subject matter in the following U.S. patent applications assigned to the assignee of the present application: U.S. patent application Ser. No. 10/833,474 entitled "MULTI-LEVEL ADMINISTRATION OF SHARED NETWORK RESOURCES", U.S. patent application Ser. No. 10/767,118 entitled "MECHANISM FOR IMPLEMENTING A SPARSE FILE SYSTEM FOR AN OPERATING SYSTEM PARTITION", U.S. patent application Ser. No. 10/767,117 entitled "MECHANISM FOR AUTOMATICALLY GENERATING UNIQUE ADDRESSES FOR NETWORK INTERFACES OF OPERATING SYSTEM PARTITIONS",U.S. patent application Ser. No. 10/766,094 entitled "INTERPROCESS COMMUNICATION WITHIN OPERATING SYSTEM PARTITIONS", U.S. patent application Ser. No. 10/744,360 entitled "SYSTEM LOGGING WITHIN OPERATING SYSTEM PARTITIONS USING LOG DEVICE NODES THAT ARE ACCESS POINTS TO A LOG DRIVER", U.S. patent application Ser. No. 10/763,147 entitled "GLOBAL VISIBILITY CONTROLS FOR OPERATING SYSTEM PARTITIONS", U.S. patent application Ser. No. 10/769,415 entitled "FINE-GRAINED PRIVILEGES IN OPERATING SYSTEM PARTITIONS", U.S. patent application Ser. No. 10/761,622 entitled "TWO-LEVEL SERVICE MODEL IN OPERATING SYSTEM PARTITIONS", U.S. patent application Ser. No. 10/767,003 entitled "VIRTUAL SYSTEM CONSOLE FOR VIRTUAL APPLICATION ENVIRONMENT", U.S. patent application Ser. No. 10/762,067 entitled "SYSTEM ACCOUNTING FOR OPERATING SYSTEM PARTITIONS", U.S. patent application Ser. No. 10/762,066 entitled "SYSTEM STATISTICS VIRTUALIZATION FOR OPERATING SYSTEM PARTITIONS", U.S. patent application Ser. No. 10/767,235 entitled "MECHANISM FOR SELECTIVELY PROVIDING MOUNT INFORMATION TO PROCESSES RUNNING WITHIN OPERATING SYSTEM PARTITIONS", U.S. patent application Ser. No. 10/771,827 entitled "MULTI-LEVEL COMPUTING RESOURCE SCHEDULING CONTROL FOR OPERATING SYSTEM PARTITIONS",U.S. patent application Ser. No. 10/771,698 entitled "MULTI-LEVEL RESOURCE LIMITS FOR OPERATING SYSTEM PARTITIONS", U.S. patent application Ser. No. 10/768,303 entitled "MECHANISM FOR ASSOCIATING RESOURCE POOLS WITH OPERATING SYSTEM PARTITIONS."

BACKGROUND

A "container" is a set of computing resources or a bounded execution environment. For example, an operating system, being such an execution environment, is a container. For another example, Java Virtual Machine (JVM), being such an execution environment, is also a container. Multiple processes, threads, and/or applications may run within such execution environments.

Some containers are software constructs and some containers are hardware constructs. For example, a single computer is a container. Some complex computers can be subdivided into multiple "domains." Each such domain is a separate container. On each domain, a separate operating system may run.

Some operating systems/execution environments may be subdivided into "projects," which are also containers. A project is a collection of processes. Logical resources may be associated with, or allocated to, projects. For example, a share of a network interface may be associated with a particular project. For another example, a set of central processing units (CPUs) may be associated with a particular project. Processes that execute as part of a project may be limited to using the resources that are associated with, or allocated to, that project.

When an operating system is started on one of a plurality of domains, the operating system has no awareness that other domains beyond the domain upon which the operating system executes exist. Similarly, when a process is started in one of a plurality of projects, the process has no awareness that other projects beyond the project in which the process executes exist.

When processes are started, they might not be aware of the resources available to them. This is especially true for containers that are a few layers above the hardware. If, at the hardware level, someone decides to remove or add some resources, there is currently no way to notify dependent processes. The processes might not be able to satisfy their service level objectives if resources are removed. For example, if hardware resources are removed, then a process that was using those resources might not be able to service a formerly agreed-upon number of transactions per second. For another example, if memory is removed, then a process that was using that memory might not be able to perform a large table operation such as a matrix operation.

Additionally, when a hardware administrator removes a domain from a complex computer, the operating system that ran on that domain is instantly and ungracefully terminated. Any projects that existed within that operating system are destroyed. Any processes that ran within those projects are also instantly and ungracefully terminated. Such processes are unable to complete the tasks upon which they had been working. The hardware administrator has no easy way of knowing the repercussions of removing the domain. The hardware administrator does not know about the operating system, the projects, or the processes that all depend upon the domain.

The hardware administrator may assume that by removing the domain, all containers and processes within the domain will be lost. However, if the hardware administrator could be aware of the current states of these containers and processes, then the hardware administrator might choose to wait before removing the domain. For example, if the hardware administrator had some way of knowing that a process had been working within the domain for sixty hours, and that the process would produce the results of its work after five more minutes of execution, the hardware administrator might choose to wait for at least five more minutes before removing the domain. Unfortunately, the hardware administrator has no easy way of discovering such facts.

Conversely, the processes executing within a container that is about to be eliminated often have no way of determining that the container is about to be eliminated. This is especially so when the processes execute immediately within another container that is contained within the container that is about to be eliminated. If the processes had some way of knowing that the elimination of the container was imminent, then the processes might be able to prepare for their impending end. For example, a process that was notified that the end was near might produce the partial results of its work, delete any temporary files that it had been using, and terminate gracefully.

Unfortunately, processes often have no way of knowing that the containers in and on which they run are about to be eliminated.

SUMMARY

In accordance with one embodiment of the present invention, there is provided a technique for resource allocation brokering in nested containers. Using this technique, communications are facilitated between higher-level containers and lower-level containers in a hierarchy of nested containers. Such communications may include notices to lower-level containers that a higher-level container is going to be removed, or that resources of a higher-level container are going to be added or removed. Such communications also may include notices to lower-level containers that specified resources of a higher-level container have been allocated to the lower-level containers.

In one embodiment, a client is started within a container. For example, the client may be a process that should be made aware of resource allocations, additions, or removals pertaining to the container. The container also contains a broker mechanism with which the client communicates to request resources and to obtain notifications of resource allocations, additions, or removals.

In one embodiment, a broker mechanism is established within a first container. A second container also is established within the first container. The second container has a client mechanism. The first container's broker mechanism communicates with the second container's client mechanism to provide notices to the second container's client mechanism.

The second container also has a broker mechanism that may or may not be a part of the second container's client mechanism. A third container is established within the second container. The third container also has a client mechanism. The second container's broker mechanism communicates with the third container's client mechanism to provide notices to the third container's client mechanism.

Thus, communications are facilitated between higher-level containers and lower-level containers in a hierarchy of nested containers.

DETAILED DESCRIPTION OF EMBODIMENT(S)

Conceptual Overview

Figure 1:
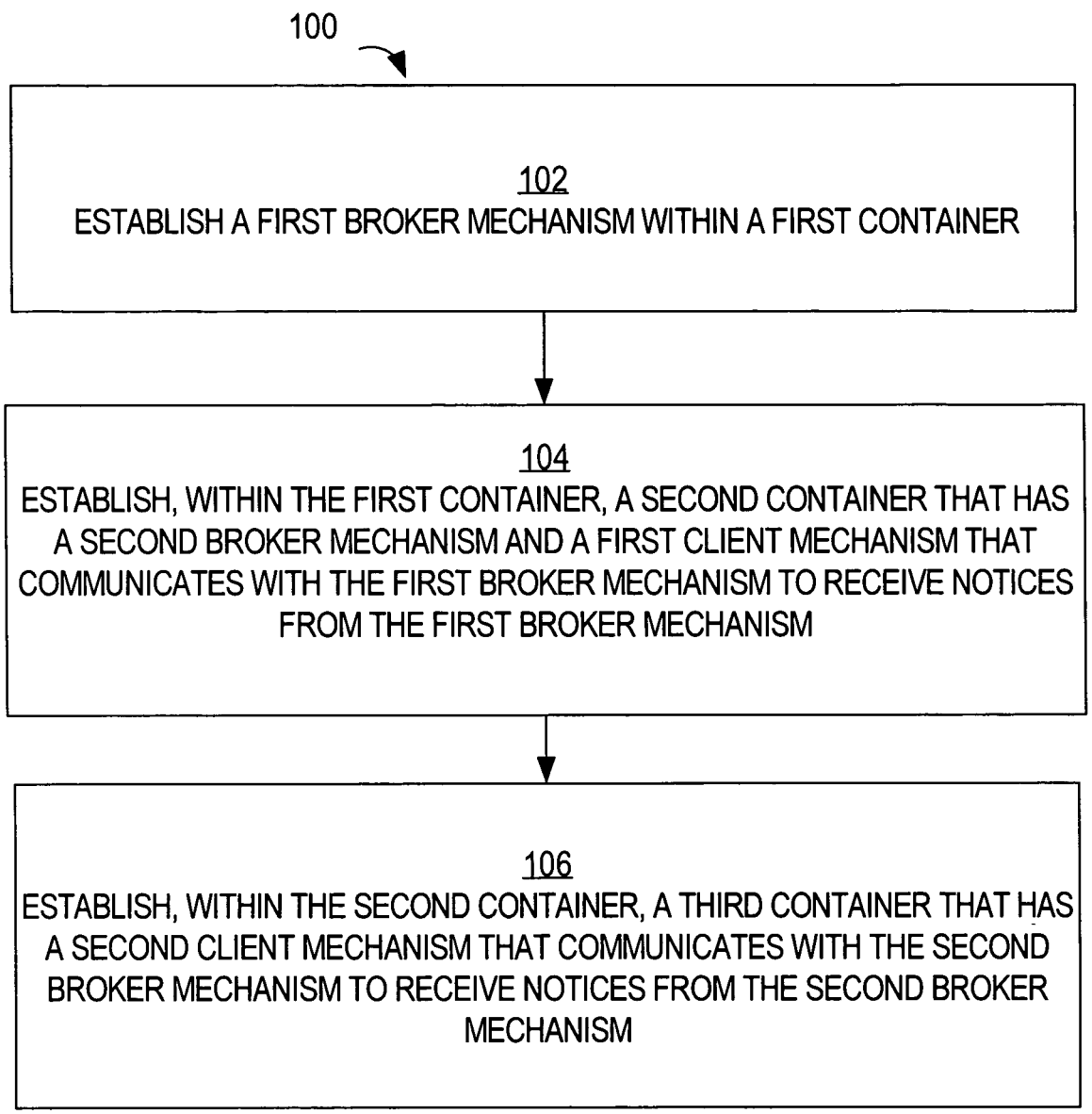
FIG. 1 is an operational flow diagram that illustrates a high level overview of the operation of one embodiment of the present invention.

In accordance with one embodiment of the present invention, there is provided a technique for resource allocation brokering in nested containers. An operational flow diagram, which illustrates a high level overview of the operation of one embodiment of the present invention, is shown in FIG. 1.

In one embodiment, a first broker mechanism is established within a first container (block 102). A second container, which has a second broker mechanism and a first client mechanism that communicates with the first broker mechanism to receive notices from the first broker mechanism, is also established within the first container (block 104). A third container, which has a second client mechanism that communicates with the second broker mechanism to receive notices from the second broker mechanism, is established within the second container (block 106).

In other aspects, the invention encompasses in some embodiments, a computer apparatus, computing system and computer-readable medium configured to carry out the foregoing technique.

System Overview

Figure 2:
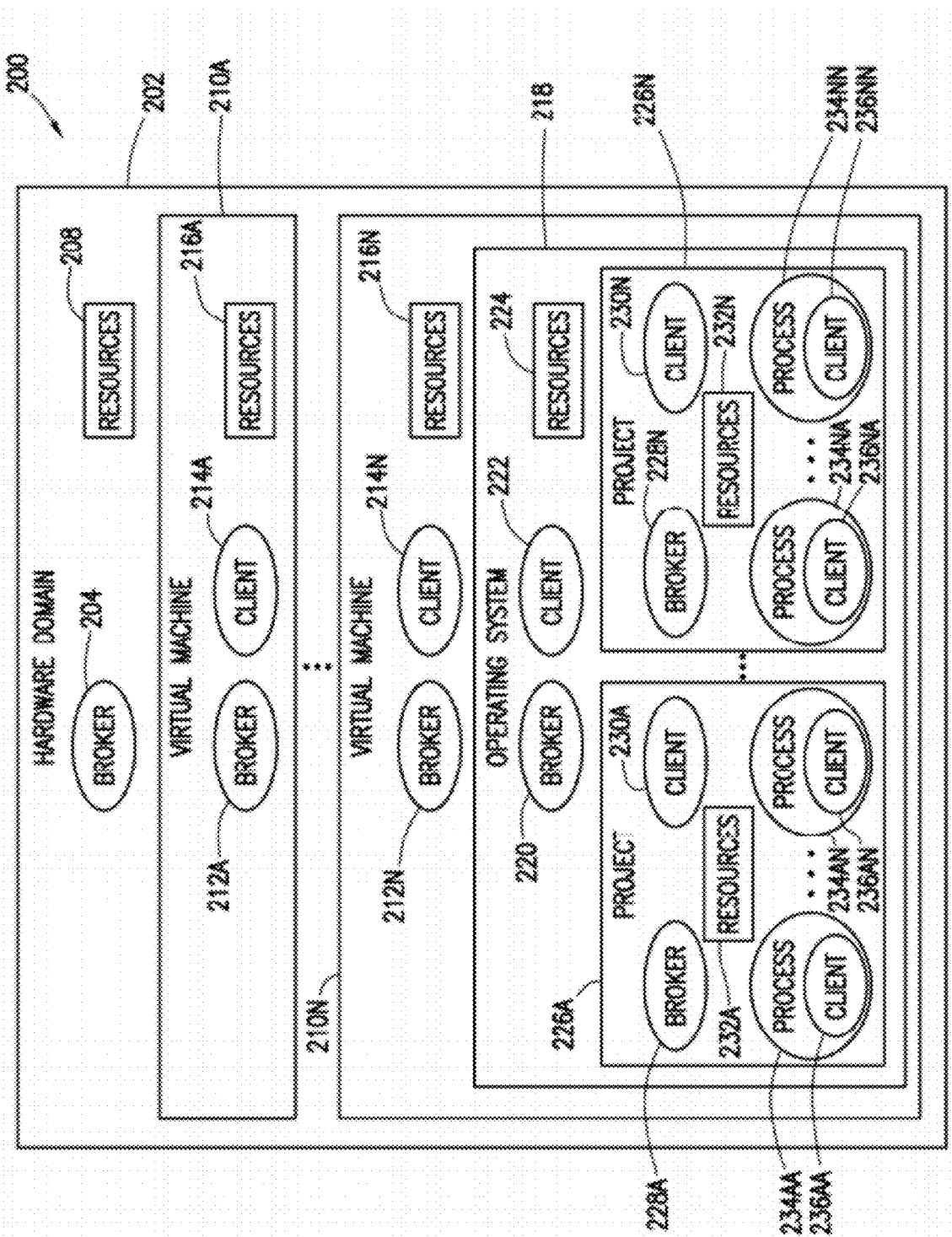
FIG. 2 is a functional block diagram that illustrates a computing environment, according to an embodiment of the present invention, in which broker mechanisms provide notices to client mechanisms within containers that are nested within containers that contain the broker mechanisms.

FIG. 2 is a functional block diagram that illustrates a computing environment 200, according to an embodiment of the present invention, in which broker mechanisms provide notices to client mechanisms within containers that are nested within containers that contain the broker mechanisms.

The computing environment of FIG. 2 depicts containers such as hardware domain 202, virtual machines 210A-N, operating system 218, and projects 226A-N. Except for hardware domain 202, each container is nested within a higher-level container. Thus, the computing environment of FIG. 2 illustrates a hierarchy of nested containers.

Hardware domain 202 contains a broker mechanism 204. Hardware domain 202 is associated with a set of resources 208. Each of virtual machines 210A-N contains a separate and corresponding one of broker mechanisms 212A-N and a separate and corresponding one of client mechanisms 214A-N. Each of virtual machines 210A-N is associated with a separate and corresponding one of sets of resources 216A-N.

Virtual machine 210N contains an operating system 218. Operating system 218 contains a broker mechanism 220 and a client mechanism 222. Operating system 218 is associated with a set of resources 224. Operating system 218 also contains projects 226A-N. Each of projects 226A-N contains a separate and corresponding one of broker mechanisms 228A-N, and a separate and corresponding one of client mechanisms 230A-N. Each of projects 226A-N is associated with a separate and corresponding one of sets of resources 232A-N.

Each of projects 226A-N also contains a separate and corresponding one of sets of processes 234A-N. For example, project 226A contains a set of processes 234AA-AN, and project 226N contains a set of processes 234NA-NN. Each of processes 234AA-NN comprises a separate and corresponding one of client mechanisms 236AA-NN.

In the computing environment of FIG. 2, broker mechanisms and client mechanisms may be implemented as processes, thread of execution, or other functional components, either logical or physical. Each broker mechanism communicates with client mechanisms that are within containers that are nested within that broker mechanism's container. Conversely, each client mechanism communicates with a broker mechanism that is contained within a container in which that client mechanism's container is nested. Thus, broker mechanisms communicate with client mechanisms that are immediately "below" the broker mechanisms' containers in the hierarchy of containers, and client mechanisms communicate with broker mechanisms that are immediately "above" the client mechanisms' container in the hierarchy of containers.

Resources 208, 216A-N, 224, and 232A-N may comprise logical and/or physical computing resources. For example, the resources may comprise central processing units, storage such as memory and disk space, peripheral computing devices, and/or shares of network bandwidth. Because resources of a higher-level container may be allocated to a lower-level container, the resources of a lower-level container may comprise some of the resources of a higher-level container. For example, each of resources 216A-N may comprise some of resources 208, resources 224 may comprise some of resources 216N, and each of resources 232A-N may comprise some of resources 224. Thus, transitively, each of resources 232A-N may comprise some of resources 208.

Broker mechanisms send notices to client mechanisms. Such notices may indicate, for example, that a container that contains the recipient of the notice is going to be removed. Such notices also may indicate, for example, that specified resources of the broker mechanism's container have been allocated to the notice recipient's container.

Processes 234AA-AN are containers also. Processes 234AA-AN each may comprise one or more separate threads of execution. Clients 236AA-AN and broker 228A communicate with each other. Similarly, clients 236NA-NN and broker 228N communicate with each other.

Nested Resource Allocation

In one embodiment, when a particular container requires some of the resources that are allocated to a higher-level container in which the particular container is nested, the particular container's client mechanism requests the resources from the higher-level container's broker mechanism. In response to such a request, the higher-level container's broker mechanism determines, based on a policy and "contracts" that are established with other containers, whether the requested resources can be allocated to the particular container.

If the higher-level container's broker mechanism determines that the requested resources can be allocated to the particular container, then the higher-level container's broker mechanism allocates the requested resources to the particular container. The higher-level container's broker mechanism stores information that indicates the portion of the higher-level container's resources that has been allocated to the particular container. The higher-level container's broker mechanism provides, to the particular container's client mechanism, a notice that indicates the portion of the higher-level container's resources that have been allocated to the particular container.

In one embodiment, the higher-level container additionally establishes a "contract" with the particular container. The "contract" comprises one or more terms. The terms may indicate, for example, that specified resources are guaranteed to be allocated to the particular container. The terms may indicate, for example, that specified resources that are allocated to the particular container may be re-allocated to other containers. Thus, a contract may indicate that a specified set of resources is currently allocated to a particular container, but also that only a subset of the specified set of resources is guaranteed to remain allocated to the particular container. For example, the bare minimum set of resources required for the particular container to function may be guaranteed to the particular container, but a more substantial set of resources may be allocated to the particular container if the demand for resources is currently low.

In one embodiment, a broker mechanism determines whether or not to allocate requested resources based on existing contracts that the broker mechanism has established with lower-level containers. For example, broker mechanism 228A might have a contract with process 234AA that guarantees that a first portion of resources 232A will remain allocated to process 234AA. While this contract is still valid, client mechanism 236AN may request, for process 234AN, a second portion of resources 232A from broker 228A. Because of the contract with process 234AA, broker mechanism 228A cannot re-allocate any of the first portion of resources 232A to process 234AN. However, if process 234AN has been allocated more than the first portion of resources 232A, then broker mechanism 228A may re-allocate, to process 234AN, at least some of the resources in excess of the first portion that have been allocated to process 234AN. In this case, broker mechanism 228A informs client 236AA that some of the resources that were allocated to process 234AA are not going to be allocated to process 234AA anymore.

In one embodiment, if a client mechanism requests more resources than a particular broker mechanism's container can provide, the particular broker mechanism requests additional resources from the broker mechanism of the next-higher container in the hierarchy of containers. The particular broker mechanism may make this request in conjunction with the client mechanism of the particular broker mechanism's container.

For example, if client mechanism 236AA requests, from broker mechanism 228A, more resources than can be allocated from resources 232A, then, in response to detecting the resource shortfall, broker mechanism 228A may request the needed resources from broker mechanism 220. Broker mechanism 228A may make the request through client 230A, which communicates with broker 220.

In response to receiving the request, broker mechanism 220 may determine whether the requested resources are available in resources 224. Broker mechanism may make this determination based on any existing contracts with projects 226A-N. If the requested resources are available in resources 224, then broker mechanism 220 may allocate a portion of the resources to container 226A; thus, the allocated resources become a part of resources 232A. In turn, broker mechanism 228A may allocated the requested resources to process 234AA.

Alternatively, if the requested resources are not available in resources 224, then broker mechanism 220 may request the needed resources from broker mechanism 212N; thus, requests for resources may proceed upward through multiple levels of containers, and allocations of resources may proceed downward through multiple levels of containers.

In one embodiment, if resources requested by a client mechanism cannot be allocated from the resources of any higher-level containers, then the broker mechanism from which the client mechanism requested the resources may provide, to the client mechanism, a notice that indicates that the requested resources cannot be allocated to the client mechanism's container. In response, the client mechanism may take appropriate action, such as gracefully terminating the client mechanism's container.

Resource Removal Notification

In one embodiment, whenever a broker mechanism detects that a resource of the broker mechanism's container is going to be removed (including the broker mechanism's container itself), that broker mechanism notifies all of the client mechanisms of the containers nested within the broker mechanism's container that the resource is going to be removed. For example, broker mechanism 204 may detect that hardware domain 202 is going to be removed; broker mechanism 204 may be informed of the impending removal by a command from a hardware administrator.

Continuing the example, in response to detecting that hardware domain 202 is going to be removed, broker mechanism 204 provides notices to client mechanisms 214A-N. Each notice informs a client mechanism that hardware domain 202 is going to be removed. In response to receiving such notices, client mechanisms 214A-N may invoke "graceful termination" mechanisms to shut down virtual machines 210A-N, respectively. For another example, broker mechanism 204 may provide notices to client mechanisms 214A-N that a particular resource of hardware domain 202 is going to be removed, and client mechanisms 214A-N may react appropriately to adjust to the impending removal.

Before invoking such mechanisms, though, each of client mechanisms 214A-N may instruct a corresponding one of broker mechanisms 212A-N to notify lower-level client mechanisms that the particular resource is going to be removed. For example, client mechanism 214N may instruct broker mechanism 212N to notify client mechanism 222 that virtual machine 210N is going to be removed. Broker mechanism 212N may provide a notice to client mechanism 222 accordingly. In response to receiving such a notice, client mechanism 222 may invoke a graceful termination mechanism to shut down operating system 218. For another example, broker mechanism 212N may provide a notice to client mechanism 222 that a particular resource of hardware domain 202 is going to be removed, and client mechanisms 222 may react appropriately to adjust to the impending removal.

Before invoking that mechanism, though, client mechanism 222 may instruct broker mechanism 220 to notify lower-level client mechanisms that operating system 218 is going to be removed. For example, client mechanism 222 may instruct broker mechanism 220 to notify client mechanism 230A that operating system 218 is going to be removed. Broker mechanism 220 may provide a notice to client mechanism 230A accordingly. In response to receiving such a notice, client mechanism 230A may invoke a graceful termination mechanism to shut down project 226A. For another example, broker mechanism 220 may provide a notice to client mechanism 230A that a particular resource of hardware domain 202 is going to be removed, and client mechanisms 230A may react appropriately to adjust to the impending removal.

Before invoking that mechanism, though, client mechanism 230A may instruct broker mechanism 228A to notify lower-level client mechanisms that project 226A is going to be removed. For example, client mechanism 230A may instruct broker mechanism 228A to notify client mechanism 236AA that project 234 is going to be removed. Broker mechanism 228A may provide a notice to client mechanism 236AA accordingly. In response to receiving such a notice, client mechanisms 236AA may invoke a graceful termination mechanism to shut down process 234AA. For another example, broker mechanism 228A may provide a notice to client mechanism 236AA that a particular resource of hardware domain 202 is going to be removed, and client mechanism 236AA may react appropriately to adjust to the impending removal.

Thus, by sending notices down through multiple levels of nested containers, lower-level containers may be shut down gracefully in response to the impending removal of a higher-level container that contains those lower-level containers. Such notices may inform clients of resource additions or resource removals.

In one embodiment, a client may request services such as "checkpoint/restart" and/or accounting services from a broker mechanism, and the broker mechanism may provide such services to clients that request such services. For example, a broker mechanism may maintain accounting information about how one or more clients are utilizing that broker mechanism's container's resources. The broker mechanism may provide such accounting information to clients upon request.

Priority-Based Reallocation

In one embodiment, when there is a resource shortfall in a particular container and resources cannot be obtained from a higher-level container in which the particular container is nested, the particular container's broker mechanism instructs one or more client mechanisms of lower-level containers to free resources allocated to those containers so that those resources can be re-allocated. In so doing, the particular container's broker mechanism may base decisions about which lower-level containers should be instructed to free resources upon priority levels that are associated with the lower-level containers.

For example, if there are insufficient resources to sustain operating system 218, then broker mechanism 220 may determine which of projects 226A-N is associated with a lowest priority level. If project 226A is associated with the lowest priority level, then broker mechanism 220 may instruct client mechanism 230A to free specified resources. If the specified resources are not currently allocated to processes 236AA-AN, then client mechanism 230A may free the specified resources.

However, if at least some of the specified resources are currently allocated one or more of processes 236AA-AN, then broker mechanism 228A may repeat the technique performed above by broker mechanism 220. For example, broker mechanism 220 may determine which of processes 234AA-AN is associated with the lowest priority level, If process 234AA is associated with the lowest priority level, then broker mechanism 220 may instruct client 236AA to free specified resources. If freeing the specified resources would leave insufficient resources for process 234AA to function, then client 236AA instructs process 234AA to shut down gracefully. The specified resources are freed.

If the resources that were freed from process 234AA are still not sufficient to allow operating system 218 to function, then broker mechanism 228A may instruct additional ones of client mechanisms 236AA-AN, based on priority levels, to free resources until sufficient resources have been freed. Similarly, if the resources that were freed from project 226A are still not sufficient to allow operating system 218 to function, then broker mechanism 220 may instruct additional ones of projects 226A-N, based on priority levels, to free resources until sufficient resources have been freed.

Thus, in one embodiment, allocated resources may be recovered from lower-level containers throughout a hierarchy of nested containers in a depth-first manner. In one embodiment, resources that have been guaranteed by contract, as described above, are only freed after all other resources that have not been so guaranteed have been freed. This technique allows as many containers as possible to exist with a bare minimum level of required resources before any of those containers are forcefully removed.

Hardware Overview

Figure 3:
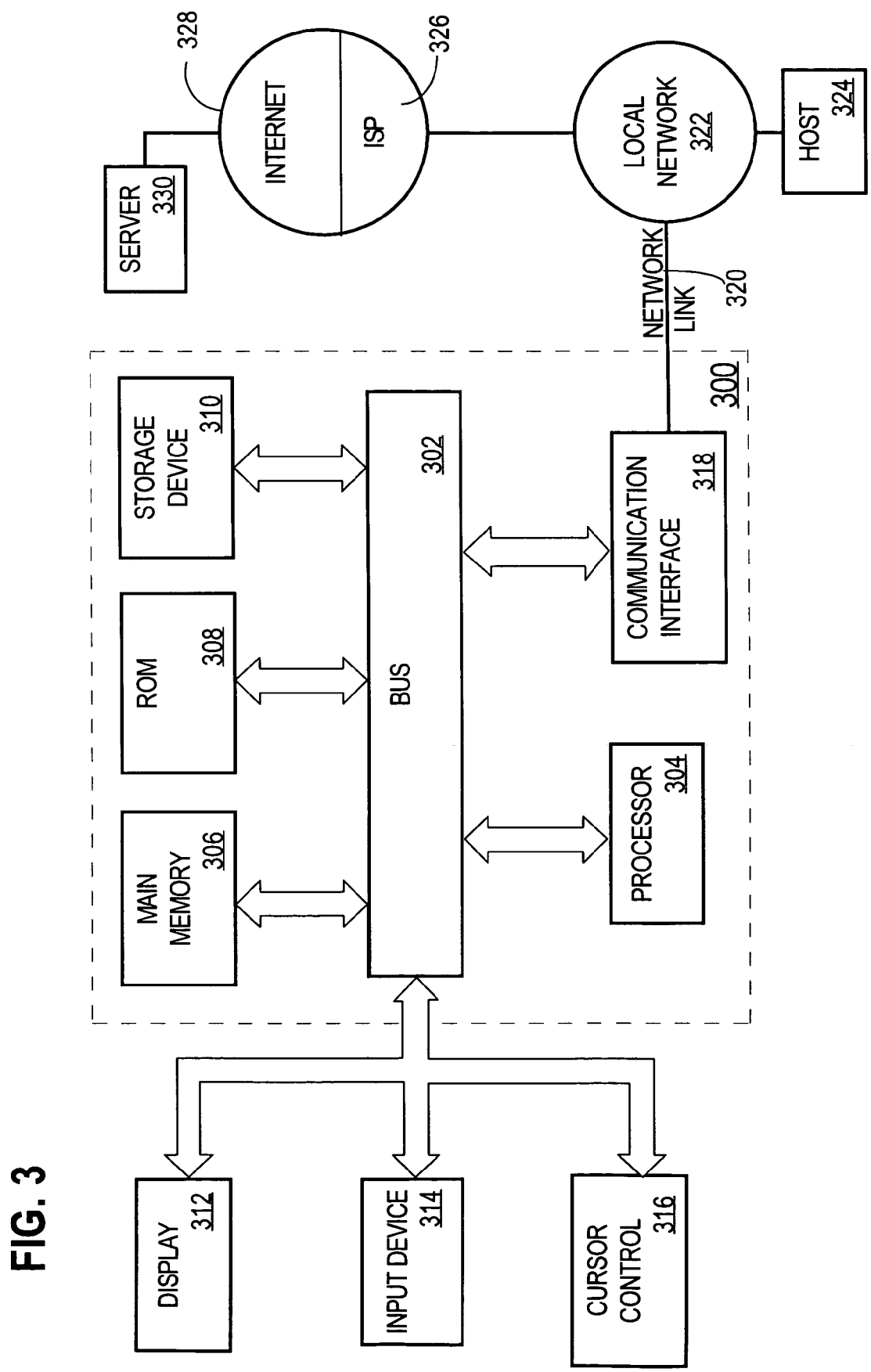
FIG. 3 is a hardware block diagram of an example computer system, which may be used to embody one or more components of an embodiment of the present invention.

FIG. 3 is a block diagram that illustrates a computer system 300 upon which an embodiment of the invention may be implemented. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, signals, data, etc., to be exchanged between the various components. For example, bus 302 may be a set of conductors that carries electrical signals. Bus 302 may also be a wireless medium (e.g. air) that carries wireless signals between one or more of the components. Bus 302 may also be a medium (e.g. air) that enables signals to be capacitively exchanged between one or more of the components. Bus 302 may further be a network connection that connects one or more of the components. Overall, any mechanism and/or medium that enables information, signals, data, etc., to be exchanged between the various components may be used as bus 302.

Bus 302 may also be a combination of these mechanisms/media. For example, processor 304 may communicate with storage device 310 wirelessly. In such a case, the bus 302, from the standpoint of processor 304 and storage device 310, would be a wireless medium, such as air. Further, processor 304 may communicate with ROM 308 capacitively. In this instance, the bus 302 would be the medium (such as air) that enables this capacitive communication to take place. Further, processor 304 may communicate with main memory 306 via a network connection. In this case, the bus 302 would be the network connection. Further, processor 304 may communicate with display 312 via a set of conductors. In this instance, the bus 302 would be the set of conductors. Thus, depending upon how the various components communicate with each other, bus 302 may take on different forms. Bus 302, as shown in FIG. 3, functionally represents all of the mechanisms and/or media that enable information, signals, data, etc., to be exchanged between the various components.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, it should be noted that although the invention has been described with reference to one embodiment, it should not be construed to be so limited. Various modifications may be made by those of ordinary skill in the art with the benefit of this disclosure without departing from the spirit of the invention. Thus, the invention should not be limited by the embodiments used to illustrate it but only by the scope of the issued claims. The specification and drawings are, accordingly, to be regarded as illustrative rather than limiting.

What is claimed is:

1. A machine-implemented method comprising:
sending, from a first broker process executing within a first container to a first client process executing within a second container, a first notice that a first plurality of computing resources will be removed,
wherein the first container is a virtual machine associated with the first plurality of computing resources,
wherein the second container is an operating system (OS) associated with a second plurality of computing resources,
wherein the first plurality of computing resources comprises the second plurality of computing resources, and
wherein the second container is within the first container;
instructing, by the first client process in response to receiving the first notice, a second broker process executing within the second container, to send a second notice to a second client process executing within a third container, wherein the second notice comprises the first notice; and
sending, from the second broker process in response to the instructing, the second notice to the second client process,
wherein the third container is a project associated with a third plurality of computing resources,
wherein the second plurality of computing resources comprises the third plurality of computing resources, and
wherein the third container is within the second container; and
invoking, by the second client process in response to receiving the second notice, a graceful termination mechanism of the third container,
wherein the first notice instructs the first client process that the first broker process has deallocated, from the second container, one or more of the second plurality of computing resources, and
wherein the first broker process provides the first notice to the first client process in response to the first broker process detecting that the first plurality of computing resources will be removed.

2. The method of claim 1, wherein the second notice instructs the second client process that the second broker process has deallocated, from the third container, one or more of the third plurality of computing resources.

3. The method of claim 1, wherein the first notice instructs the first client process to release, from the second container, one or more of the second plurality of computing resources.

4. The method of claim 1, wherein the second notice instructs the first client process that the first container is going to be removed.

5. The method of claim 1, wherein the second notice is provided to the second client process in response to the first client process receiving the first notice, and wherein the second notice instructs the second client process that the first container is going to be removed.

6. The method of claim 1, wherein the OS is executing within the virtual machine.

7. The method of claim 1, wherein the project is executing within the OS.

8. The method of claim 1, wherein the first notice instructs the OS to invoke a graceful termination mechanism.

9. A non-transitory computer-storage medium storing one or more sequences of instructions, which instructions, when executed by one or more processors, cause the one or more processors to carry out the steps of:
sending, from a first broker process executing within a first container to a first client process executing within a second container, a first notice that a first plurality of computing resources will be removed,
wherein the first container is a virtual machine associated with the first plurality of computing resources,
wherein the second container is an operating system (OS) associated with a second plurality of computing resources,
wherein the first plurality of computing resources comprises the second plurality of computing resources, and
wherein the second container is within the first container;
instructing, by the first client process in response to receiving the first notice, a second broker process executing within the second container, to send a second notice to a second client process executing within a third container, wherein the second notice comprises the first notice; and
sending, from the second broker process in response to the instructing, the second notice to the second client process,
wherein the third container is a project associated with a third plurality of computing resources,
wherein the second plurality of computing resources comprises the third plurality of computing resources, and
wherein the third container is within the second container; and
invoking, by the second client process in response to receiving the second notice, a graceful termination mechanism of the third container,
wherein the first notice instructs the first client process that the first broker process has deallocated, to the second container, one or more of the second plurality of computing resources, and
wherein the first broker process provides the first notice to the first client process in response to the first broker process detecting that the first plurality of computing resources will be removed.

10. The non-transitory computer-readable medium of claim 9 wherein the second notice instructs the second client process that the second broker process has deallocated, from the third container, one or more of the third plurality of computing resources.

11. The non-transitory computer-readable medium of claim 9, wherein the first notice instructs the first client process to release, from the second container, one or more of the second plurality of computing resources.

12. The non-transitory computer-readable medium of claim 9, wherein the first notice instructs the first client process that the first container is going to be removed.

13. The non-transitory computer-readable medium of claim 9, wherein the second notice is provided to the second client process in response to the first client process receiving the first notice, and wherein the second notice instructs the second client process that the first container is going to be removed.

14. The non-transitory computer-readable medium of claim 9, wherein the OS is executing within the virtual machine.

15. The non-transitory computer-readable medium of claim 9, wherein the project is executing within the OS.

16. The non-transitory computer-readable medium of claim 9, wherein the first notice instructs the OS to invoke a graceful termination mechanism.

17. An apparatus comprising:
a processor;
a first container comprising a first broker process executing within the first container, wherein the first container is a virtual machine associated with a first plurality of computing resources;
a second container within the first container, comprising:
a first client process executing within the second container, wherein the first broker process communicates with the first client process to provide a first notice to the first client process that the first plurality of computing resources will be removed, and
a second broker process executing within the second container,
wherein the first client process is configured to instruct the second broker process to send a second notice to a second client process, wherein the second notice comprises the first notice,
wherein the second container is an operating system (OS) associated with a second plurality of computing resources; and
a third container within the second container comprising:
the second client process executing within the third container, wherein the second broker process communicates with the second client process to provide the second notice to the second client process,
wherein the third container is a project associated with a third plurality of computing resources,
wherein the first plurality of computing resources comprises the second plurality of computing resources, wherein the second plurality of computing resources comprises the third plurality of computing resources, and wherein the third container is executing on the processor,
wherein in response to receiving the second notice, the second client process invokes a graceful termination mechanism of the third container,
wherein the first notice instructs the first client process that the first broker process has deallocated, from the second container, one or more of the second plurality of computing resources, and
wherein the first broker process provides the first notice to the first client process in response to the first broker process detecting that the first plurality of computing resources will be removed.

18. The apparatus of claim 17, wherein the second notice instructs the second client process that the second broker process has deallocated, from the third container, one or more of the third plurality of computing resources.

19. The apparatus of claim 17, wherein the first notice instructs the first client process to release, from the second container, one or more of the second plurality of computing resources.

20. The apparatus of claim 17, wherein the second notice instructs the first client process that the first container is going to be removed.

21. The apparatus of claim 17, wherein the second notice is provided to the second client process in response to the first client process receiving the first notice, and wherein the second notice instructs the second client process that the first container is going to be removed.

22. The apparatus of claim 17, wherein the OS is executing within the virtual machine.

23. The apparatus of claim 17, wherein the project is executing within the OS.

24. The apparatus of claim 17, wherein the first notice instructs the OS to invoke a graceful termination mechanism.

* * * * *